(12) United States Patent
Gu et al.

(10) Patent No.: US 11,018,493 B2
(45) Date of Patent: May 25, 2021

(54) METHOD FOR DRIVING BACKLIGHT MODULE, DRIVING DEVICE AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qibing Gu, Beijing (CN); Bo Gao, Beijing (CN); Wei Sun, Beijing (CN); Lingyun Shi, Beijing (CN); Hao Zhang, Beijing (CN); Guangquan Wang, Beijing (CN); Ming Chen, Beijing (CN); Xue Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 16/122,320

(22) Filed: Sep. 5, 2018

(65) Prior Publication Data

US 2019/0181631 A1 Jun. 13, 2019

(30) Foreign Application Priority Data

Dec. 12, 2017 (CN) .......................... 201711320655.7

(51) Int. Cl.
*H02H 3/20* (2006.01)
*G02F 1/13357* (2006.01)
(Continued)

(52) U.S. Cl.
CPC .......... *H02H 3/20* (2013.01); *G02F 1/133603* (2013.01); *G09G 3/342* (2013.01);
(Continued)

(58) Field of Classification Search
None
See application file for complete search history.

(56) References Cited

U.S. PATENT DOCUMENTS 4,910,702 A * 3/1990 Boon ...................... H03K 4/023
708/852
7,081,722 B1 * 7/2006 Huynh ................... H05B 45/50
315/323
(Continued)

FOREIGN PATENT DOCUMENTS

CN 101354867 A 1/2009
CN 101620836 A 1/2010
(Continued)

OTHER PUBLICATIONS

Office Action dated Apr. 24, 2019 issued in corresponding Chinese Application No. 201711320655.7.
(Continued)

*Primary Examiner* — Amy Cohen Johnson
*Assistant Examiner* — Jianzi Chen
(74) *Attorney, Agent, or Firm* — Nath, Goldberg & Meyer; Joshua B. Goldberg (57) ABSTRACT

A method for driving a backlight module, a driving device and a display apparatus are provided. The backlight module is divided into a plurality of light-emitting areas, each of the light-emitting areas including a plurality of lines of point sources, and the driving device includes a controller and a driving component, the driving component is connected to the controller and is configured to output a time series of voltage signal to the controller, and the controller is connected to all the plurality of lines of point sources in each of the light-emitting areas and is configured to drive the lines
(Continued)

of point sources in the light-emitting area to emit light respectively at different periods based on the time series of voltage signal.

12 Claims, 4 Drawing Sheets

(51) Int. Cl.
  *G09G 3/34* (2006.01)
  *H05B 45/50* (2020.01)
  *G02F 1/1335* (2006.01)
(52) U.S. Cl.
  CPC ... *G02F 1/133612* (2021.01); *G09G 2330/04* (2013.01); *H05B 45/50* (2020.01)

(56) References Cited

U.S. PATENT DOCUMENTS

| | | | |
|---|---|---|---|
| 9,401,600 B2 | 7/2016 | Zhang et al. | |
| 9,601,068 B2 | 3/2017 | Zhang | |
| 2013/0107406 A1* | 5/2013 | Johnson | H02J 7/0034 361/84 |
| 2015/0312977 A1* | 10/2015 | Jong | H05B 45/44 315/186 |
| 2016/0381751 A1* | 12/2016 | Bong | F21K 9/20 315/193 |
| 2018/0174533 A1 | 6/2018 | An | |
| 2019/0317369 A1* | 10/2019 | Chen | G02F 1/133308 |

FOREIGN PATENT DOCUMENTS

| | | |
|---|---|---|
| CN | 201435199 Y | 3/2010 |
| CN | 102610207 A | 7/2012 |
| CN | 103000132 A | 3/2013 |
| CN | 103249195 A | 8/2013 |
| CN | 203522513 U | 4/2014 |
| CN | 103939800 A | 7/2014 |
| CN | 104050944 A | 9/2014 |
| CN | 104332139 A | 2/2015 |
| CN | 105957484 A | 9/2016 |
| CN | 107331355 A | 11/2017 |
| EP | 3493194 A1 | 6/2019 |
| WO | WO-2016060541 A1 * | 4/2016 ............. H02H 9/025 |

OTHER PUBLICATIONS

Second Office Action dated Dec. 30, 2019, for corresponding Chinese application 201711320655.7.

* cited by examiner

METHOD FOR DRIVING BACKLIGHT MODULE, DRIVING DEVICE AND DISPLAY APPARATUS

CROSS-REFERENCE TO RELATED APPLICATIONS

The present application claims the priority to the Chinese Patent Application No. 201711320655.7, filed on Dec. 12, 2017, to the Chinese Intellectual Property Office, the contents of which are incorporated herein in their entirety by reference.

TECHNICAL FIELD

The present disclosure relates to the field of display technology, and in particular to a method for driving a backlight module, a driving device and a display apparatus.

BACKGROUND

With the development of a display panel, display technology regarding AR/VR/TV/MNT with high resolution and the like is improving, and requirements for brightness and contrast is becoming higher and higher. A traditional LCD module is disadvantageous in working stability and brightness, and is advantageous in cost, power consumption and productivity. In a close-range AR&VR display product, in order to prevent vertigo caused by deflection of liquid crystal molecules, black frame insertion technology is used and this technology requires that a backlight has a very high instantaneous brightness. At present, the operating current of the LED is improved generally by the use of a direct-lit backlight, thereby improving brightness.

SUMMARY

The present disclosure provides a driving device for driving a backlight module which is divided into a plurality of light-emitting areas, each of the light-emitting areas comprising a plurality of lines of point sources, wherein the driving device comprises a controller and a driving component, the driving component is connected to the controller and is configured to output time series of voltage signal to the controller, and the controller is connected to the plurality of lines of point sources in each of the plurality of light-emitting areas and is configured to drive the lines of point sources in the respective light-emitting areas to emit light respectively at different periods based on the time series of voltage signal.

In an embodiment, the controller comprises a plurality of overvoltage protection circuits corresponding to the plurality of light-emitting areas one by one; ranges of preset voltage values of the plurality of overvoltage protection circuits do not overlap with each other, and each of the plurality of overvoltage protection circuits having one terminal connected to the driving component and another terminal connected to the plurality of lines of point sources in a corresponding light-emitting area, is configured to supply a driving voltage signal to one light-emitting area and drive the lines of point sources in the one light-emitting area to emit light when a voltage signal output from the driving component falls within a range of preset voltage values of one of the plurality of overvoltage protection circuits corresponding to the one light-emitting area.

In an embodiment, the overvoltage protection circuit comprises a Zener diode, a transistor and a resistor; one end of the Zener diode is connected to both one end of the resistor and a gate electrode of the transistor, and the other end of the Zener diode is connected to ground; the other end of the resistor is connected to both a drain electrode of the transistor and the driving component, and a source electrode of the transistor is connected to the plurality of lines of point sources in the light-emitting area corresponding to the overvoltage protection circuit, and clamp voltages of the Zener diodes of the overvoltage protection circuits corresponding to the respective light-emitting areas are different from each other.

In an embodiment, a lower limit of the range of the preset voltage values of the overvoltage protection circuit is associated with a turn-on voltage for the plurality of point sources in the light-emitting area corresponding to the overvoltage protection circuit, the turn-on voltages for the plurality of point sources in respective the light-emitting areas are different from each other, and an upper limit of the range of the preset voltage values of the overvoltage protection circuit is associated with a clamp voltage of the Zener diode of the overvoltage protection circuit.

In an embodiment, each line in a light emitting area is provided with a same number of point sources; the number of point sources in each light-emitting area increases as a sequence number of the light-emitting area increases, and the clamp voltage of the Lever diode of the overvoltage protection circuit corresponding to each light-emitting area increases as the sequence number of the light-emitting area increases.

In an embodiment, the backlight module comprises a thousand backlight partitions divided into five light-emitting areas, each of which comprises four lines of point sources, each line in a same light-emitting area is provided with a same number of point sources, and the number of point sources in each light-emitting area increases in an arithmetic progression having a tolerance of 4.

In an embodiment, the time series of voltage signal output from the driving component is a timing voltage signal which is step-shaped and has different steps at different periods in one cycle, and voltage values at the different steps are progressively increased with time.

The present disclosure further provides a display apparatus including the above driving device.

The present disclosure further provides a method for driving a backlight module by the driving device of claim 1, and the method comprises: outputting, by the driving component, the time series of voltage signal to the controller; and driving, by the controller, the lines of point sources in respective light-emitting areas respectively at different periods based on the time series of voltage signal, such that the lines of point sources in respective light-emitting areas emit light at different periods.

In an embodiment, the time series of voltage signal output from the driving component is a timing voltage signal which is step-shaped and has different steps at different periods in one cycle, and voltage values at the different steps are progressively increased with time.

In an embodiment, in a case where the controller comprises a plurality of overvoltage protection circuits corresponding to respective light-emitting areas one by one, ranges of preset voltage values of the overvoltage protection circuits corresponding to different light-emitting areas do not overlap with each other, and the step of driving, by the controller, the lines of point sources in respective light-emitting areas respectively at different periods based on the time series of voltage signal, such that the lines of point sources in respective light-emitting areas emit light at different periods comprises: outputting, by the controller, a driving voltage signal to one light-emitting area and drive the lines of point sources in the one light-emitting area to emit light when a voltage signal output from the driving component falls within a range of preset voltage values of one of the plurality of overvoltage protection circuits corresponding to the one light-emitting area.

In an embodiment, the lines of point sources in the backlight module correspond to a plurality of lines of pixel units in a display panel line by line.

In an embodiment, the step of driving, by the controller, the lines of point sources in respective light-emitting areas respectively at different periods based on the time series of voltage signal, such that the lines of point sources in respective light-emitting areas emit light at different periods comprises: driving, by the controller, the lines of point sources in a light-emitting area to emit light after a first time delay elapses from a time instant that a line scan of respective lines of pixel units corresponding to the lines of point sources is completed.

In an embodiment, the first time delay is a time required by the respective lines of pixel units to complete deflection of liquid crystal molecules.

BRIEF DESCRIPTION OF THE DRAWINGS

Drawings are provided to make a person skilled in the art better understand the present disclosure, and constitute a part of the description. The drawings are used to interpret the present disclosure together with embodiments of the present disclosure, and will not limit the present disclosure.

DETAILED DESCRIPTION

In order to make a person skilled in the art better understand the technical solution in the present disclosure, the specific implementations of the present disclosure will be described in detail below in conjunction with the drawings.

Although a direct-lit backlight solves the problem regarding an operating current of an LED, the number of LED Driving ICs is increased. For example, one thousand LEDs form a backlight module having one thousand partitions, and an existing sixty-three LED driving ICs may be used if each LED driving IC has sixteenth channels. Due to the large number of LED Driving ICs, the cost and the area of printed circuit board (PCB) are greatly increased. More pressingly, the above solution cannot be applied to small-sized products such as VR.

Figure 1:
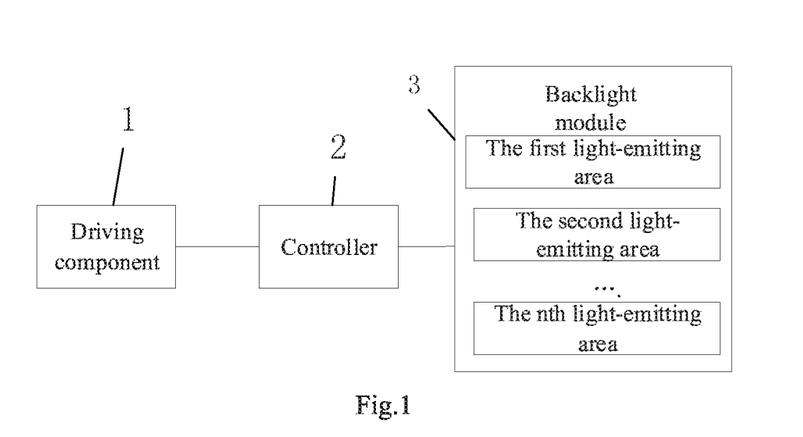
FIG. 1 is a structural block diagram of a driving device according to an embodiment of the present disclosure.

Referring to FIG. 1, a structural block diagram of a driving device according to an embodiment of the present disclosure is shown. The driving device is configured to drive a backlight module 3 which is divided into a plurality of light-emitting areas including a first light-emitting area through an nth light-emitting area (n is an integer larger than 1). Each of the light-emitting areas includes a plurality of lines of point sources. Specifically, the driving device includes a controller 2 and a driving component 1. The driving component 1 is connected to the controller 2 and is configured to output a timing voltage signal (hereinafter referred to time series of voltage signal) to the controller 2.

In a practical application, a digital circuit is provided in the driving component and is configured to generate the time series of voltage signal.

For example, the driving component 1 may be a driving IC or other driving circuit.

Figure 2:
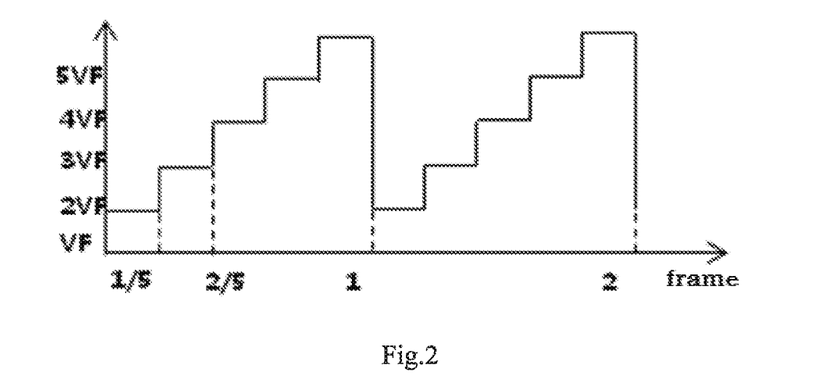
FIG. 2 is a schematic diagram of a time series of voltage signal from a driving component according to an embodiment of the present disclosure.

The time series of voltage signal output from the driving component 1 may be a step-shaped voltage signal whose voltage values at different steps are progressively increased at different periods in one cycle of one image frame. As an example, the time series of voltage signal may be as shown in FIG. 2. As shown in FIG. 2, one step corresponds to one period, the value of the voltage signal at one period is constant, and one cycle is a time for displaying one image frame.

The horizontal axis in FIG. 2 represents the number of frames of an image, and the vertical axis represents the voltage value of the time series of voltage signal.

The controller 2 is further connected to the plurality of lines of point sources in each of the light-emitting areas and is configured to drive the lines of point sources in respective light-emitting areas to emit light respectively at different periods based on the time series of voltage signal.

The backlight module is divided into a plurality of light-emitting areas (e.g., the first light-emitting area through the nth light-emitting area). Each of the light-emitting areas may include at least one line of point sources. For example, each of the light-emitting areas may include one line of point sources, two lines of point sources and even more lines of point sources.

The controller 2 is connected to all the first light-emitting area through the nth light-emitting area, and is configured to drive the lines of point sources in the first light-emitting area through the nth light-emitting area to emit light respectively at different periods based on the time series of voltage signal output from the driving component 1.

Figure 3:
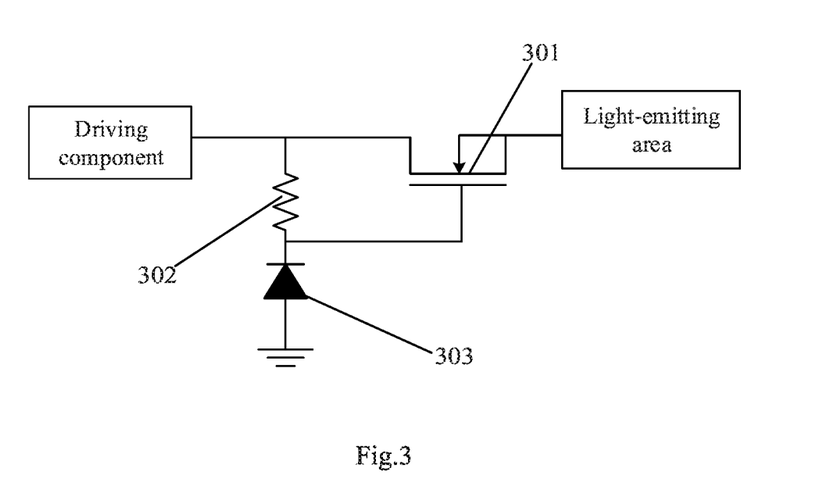
FIG. 3 is a structural schematic diagram of an overvoltage protection circuit according to an embodiment of the present disclosure.

As an implementation, the controller 2 includes a plurality of overvoltage protection circuits corresponding to the plurality of light-emitting areas one by one. One terminal of the overvoltage protection circuit is connected to the driving component 1 and another terminal of the overvoltage protection circuit is connected to the lines of point sources in a corresponding light-emitting area. The overvoltage protection circuit is configured to output a driving voltage signal to one light-emitting area and drive the lines of point sources in the one light-emitting area to emit light when a voltage signal output from the driving component 1 fall within a range of preset voltage values of one of the plurality of overvoltage protection circuits corresponding to the one light-emitting area. The ranges of preset voltage values of the overvoltage protection circuits corresponding to different light-emitting areas do not overlap with each other. FIG. 3 shows an example of the overvoltage protection circuit.

The overvoltage protection circuit of FIG. 3 includes a Zener diode 303, a transistor 301 and a resistor 302. One end of the Zener diode 303 is connected to both one end of the resistor 302 and a gate electrode of the transistor 301, and the other end of the Zener diode 303 is connected to ground.

The other end of the resistor 302 is connected to both a drain electrode of the transistor 301 and the driving component 1, and a source electrode of the transistor 301 is connected to the lines of point sources in the light-emitting area corresponding to the overvoltage protection circuit.

In an embodiment, the transistor 301 may be a NMOS transistor or a PMOS transistor.

Figure 4:
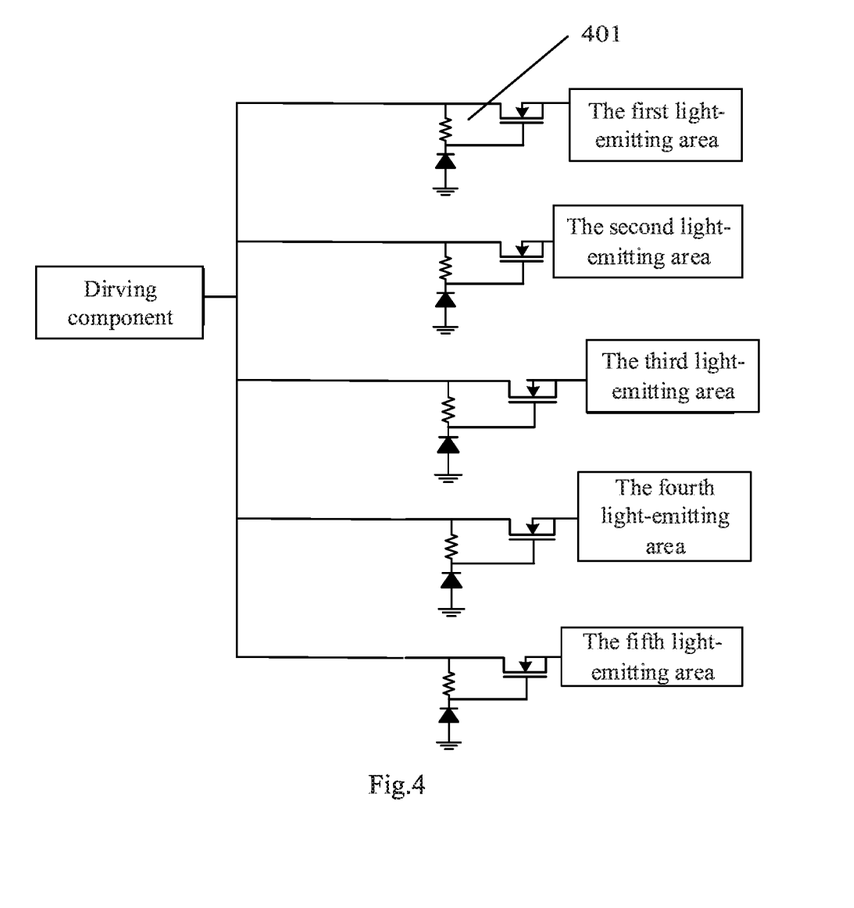
FIG. 4 is a schematic diagram illustrating an example in which a plurality of overvoltage protection circuits are respectively connected to a plurality of light-emitting areas according to an embodiment of the present disclosure.

FIG. 4 is a schematic diagram illustrating an example in which the overvoltage protection circuits are connected to different light-emitting areas respectively. In addition, clamp voltages of the Zener diodes of the respective overvoltage protection circuits corresponding to the different light-emitting areas are different. The transistors of the different overvoltage protection circuits are controlled to be turned on/off by the different clamp voltages, such that the lines of point sources of different light-emitting areas are turned on respectively.

In FIG. 4, for example, the backlight module is divided into five light-emitting areas (i.e., the first light-emitting area through the fifth light-emitting area). Therefore there are five corresponding overvoltage protection circuits 401. The overvoltage protection circuits 401 include the first overvoltage protection circuit through the fifth overvoltage protection circuit. Each of the overvoltage protection circuits 401 is connected to the lines of point sources in a corresponding light-emitting area.

For example, taking FIG. 4 as an example, a process of turning on the respective lines of point sources of the respective light-emitting areas by the overvoltage protection circuits will be described.

Assuming that each of the first light-emitting area through the fifth light-emitting area) includes four lines of point sources. That is, the first light-emitting area includes a first line of point sources, a second line of point sources, a third line of point sources and a fourth line of point sources; the second light-emitting area includes a fifth line of point sources, a sixth line of point sources, a seventh line of point sources and an eighth line of point sources, and so on.

Taking the first line of point sources through the fourth line of point sources in the first light-emitting area as an example, it is assumed that a backlight voltage VF of the point sources in the first light-emitting area is 2.6V (herein, the backlight voltage is a voltage that ensures the point sources to be turned on), and an adjustment voltage to the driving IC for LEDs is 0.5. V, and therefore a voltage output by the driving component 1 should not be less than 3.1V. If the voltage output by the driving component 1 is less than 3.1V, the point sources in the first light-emitting area cannot be turned on. In addition, it is assumed that the turn-on voltage VGS of the NMOS transistor is 0.2V, and the clamp voltage of the Zener diode is selected to be 3.3V.

For example, when the voltage output from the driving component 1 is 3.1V, the Zener diode is not broken down, the NMOS transistor is turned on, and therefore the first through fourth lines of point sources in the first light-emitting area are turned on.

When the voltage output from the driving component is higher than 3.5V, since the clamp voltage of the Zener diode is 3.3V, the Zener diode is broken down, and the voltage input to the NMOS transistor is less than 0.2V, the NMOS transistor is turned off, and therefore the first through fourth lines of point sources in the first light-emitting area are turned off.

In the overvoltage protection circuit corresponding to the fifth through eighth lines of point sources in the second light-emitting area, the clamp voltage of the Zener diode is selected to be 5.9V, and the backlight voltage VF of the lines of point sources in the second light-emitting area is assumed to be 5.2V. Considering that the adjustment voltage to the driving ICs for LEDs is 0.5 V, when the voltage output from the driving component 1 is 5.7 V, the fifth through eighth lines of point sources are turned on. At this time, the first through fourth point sources are turned off, and the point sources in the third light-emitting area through the fifth light-emitting area are also turned off.

The above examples explain that the point sources in the different light-emitting areas are turned on respectively by controlling the clamp voltages of the Zener diodes in the respective overvoltage protection circuits and simultaneously based on the backlight voltages of the point sources in the respective light-emitting areas.

According to an embodiment of the present disclosure, the backlight voltage of the point sources in each of the light-emitting areas may be determined by changing the number of point sources in the light-emitting area.

Optionally, each line in a light-emitting area is provided with a same number of point sources. The number of point sources in each light-emitting area increases as the sequence number of the light-emitting area in the backlight module increases (i.e., the number of point sources in a light-emitting area is smaller than that in a subsequent light-emitting area). The clamp voltage of the Zener diode of the overvoltage protection circuit corresponding to each light-emitting area increases as the sequence number of the light-emitting area of the backlight module increases (i.e., the clamp voltage of the Zener diode in the overvoltage protection circuit in a light-emitting area is smaller than that in a subsequent light-emitting area).

In a practical application, each line in a light-emitting area is provided with a same number of point sources. The number of point sources in a light-emitting area in the backlight module increases as the sequence number of the light-emitting area increases, for example, increasing in an arithmetic progression having a tolerance of 1, 2, or 3 and so on. In addition, the clamp voltage of the Zener diode of the overvoltage protection circuit of a light-emitting area in the backlight module increases as the sequence number of the light-emitting area increases.

With the overvoltage protection circuit of the present embodiment, the controller may also be configured to drive the lines of point sources of each light-emitting area to be turned on with a time delay. For example, after a first time delay elapses from the point sources in the first light-emitting area being turned on, the point sources in the second light-emitting area are turned on, and so on, thereby turning on the lines of point sources of each light-emitting area with a time delay.

In the present embodiment, the backlight module is divided into a plurality of light-emitting areas, each of which includes a plurality of lines of point sources, and the driving device includes a controller and a driving component, the driving component is connected to the controller and is configured to output a time series of voltage signal to the controller, and the controller is connected to the plurality of lines of point sources in each of the light-emitting areas and is configured to drive the lines of point sources in the light-emitting areas to emit light respectively at different periods based on the time series of voltage signal. Therefore, the driving circuit can be reused, the number of the driving circuits can be reduced, and the area of the PCB can be reduced.

Figure 5:
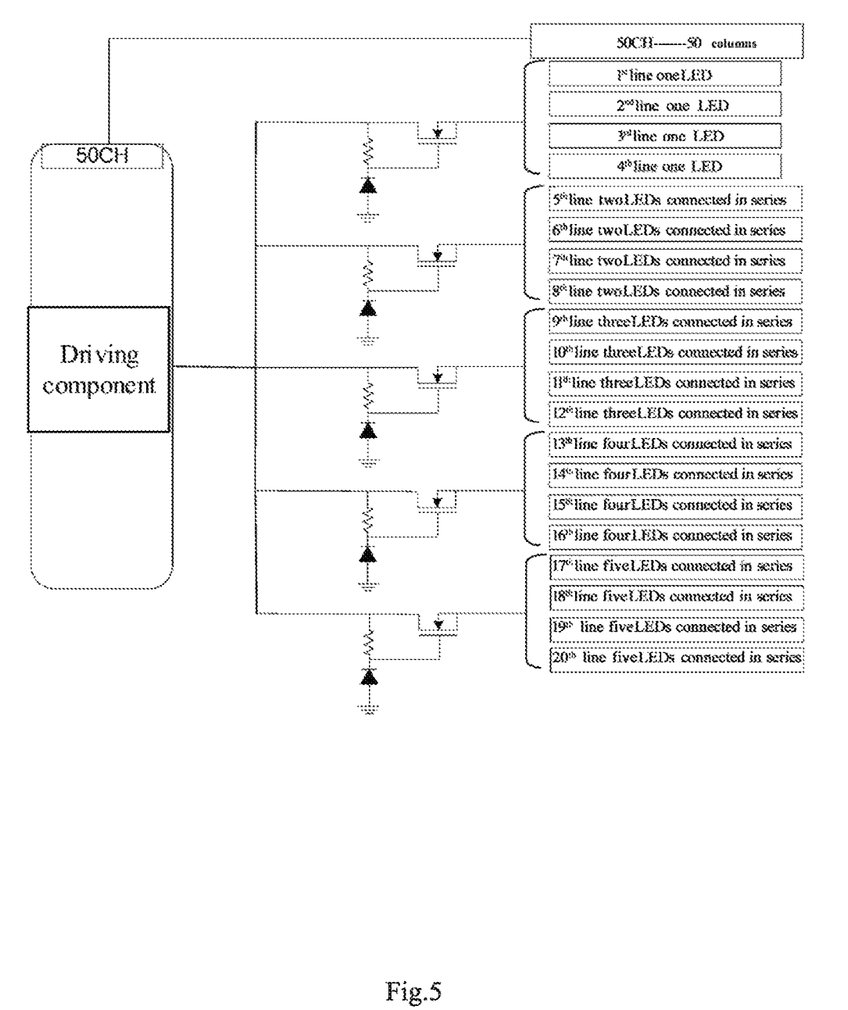
FIG. 5 is an example of the driving device of the present disclosure for turning on a plurality of lines of point sources in different light-emitting areas.

In order to enable those skilled in the art to better understand the technical solutions defined by the present disclosure, FIG. 5 shows an example in which the respective lines of point sources in different light-emitting areas are turned on by the driving device of the present disclosure.

The driving device includes a driving component and an overvoltage protection circuit. The backlight module includes a thousand (20 lines*50 columns) backlight partitions, which are divided into five light-emitting areas. Each of the light-emitting areas includes four lines of point sources, and the number of point sources of each light-emitting area increases with an arithmetic progression having a tolerance of 4. That is, the first light-emitting area includes the first through fourth lines of point sources, each line of point sources including one LED. The second light-emitting area includes the fifth through eighth lines of point sources, each line of point sources including two LEDs connected in series. The third light-emitting area includes the ninth through twelfth lines of point sources, each line of point sources including three LEDs connected in series. The fourth light-emitting area includes the thirteenth through sixteenth lines of point sources, each line of point sources including four LEDs connected in series. The fifth light-emitting area includes the seventeenth through twentieth lines of point sources, each line of point sources including five LEDs connected in series. The first overvoltage protection circuit through the fifth overvoltage protection circuit are respectively connected to the first light-emitting area through the fifth light-emitting area, and each overvoltage protection circuit is connected to all the lines of LEDs in a corresponding light-emitting area, and the 50 columns of LEDs are connected to fifty channels (50 CH) of the driving component.

The clamp voltage of the Zener diode may be appropriately set according to the backlight voltage of the point sources in the light-emitting area. For example, the clamp voltage of the Zener diode of the first overvoltage protection circuit is set between VF and 2 VF, and the clamp voltage of the Zener diode of the second overvoltage protection circuit is set between 2 VF and 3 VF, and so on, so that the point sources in the light-emitting areas can be controlled to be turned on/off as follows. Referring to the timing diagram in FIG. 2, when the time series of voltage signal, from the driving component to the overvoltage protection circuit, is greater than VF and less than the clamp voltage of the Zener diode of the first overvoltage protection circuit, the transistor of the first overvoltage protection circuit is turned on, and the lines of point sources in the first light-emitting area are turned on, while the transistors of the other overvoltage protection circuits are turned off, and the lines of point sources in the other light-emitting areas are turned off. When the time series of voltage signal inputted is greater than 2 VF and less than 3 VF, the lines of point sources in the second light-emitting area are turned on, while the lines of point sources in the other light-emitting areas are turned off. When the time series of voltage signal inputted is greater than 3 VF and less than 4 VF, the lines of point sources in the third light-emitting area are turned on, while the lines of point sources in the other light-emitting areas are turned off. When the time series of voltage signal inputted is greater than 4 VF and less than 5 VF, the lines of point sources in the fourth light-emitting area are turned on, while the lines of point sources in the other light-emitting areas are turned off. When the time series of voltage signal inputted is greater than 5 VF, the lines of point sources in the fifth light-emitting area are turned on, while the lines of point sources in the other light-emitting areas are turned off. Therefore, the overvoltage protection circuits may be controlled to turn on the lines of point sources in different light-emitting areas.

The present disclosure also discloses a display apparatus including the driving device of the above embodiment.

It should be noted that, the display apparatus in this embodiment may be any product or component having a display function such as a mobile phone, a tablet computer, a television set, a notebook computer, a digital photo frame, a navigator.

The display apparatus has all the advantages of the driving device in the above embodiments, which will not be repeated any more.

Figure 6:
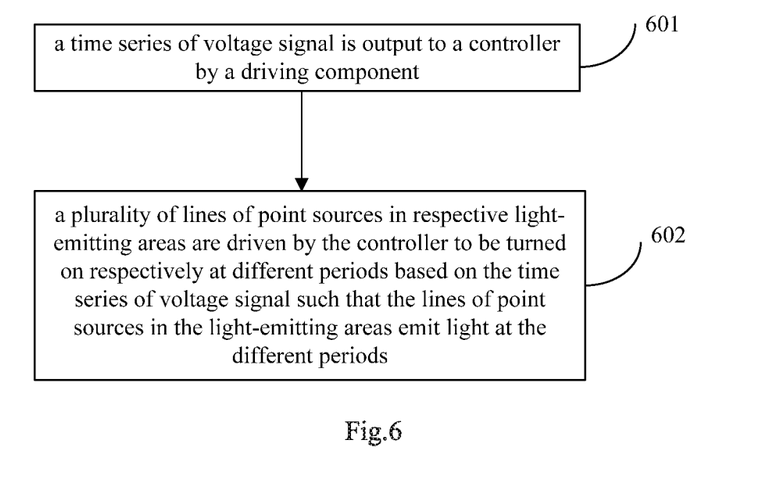
FIG. 6 is a flow chart of a method for driving a backlight module according to the present disclosure.

FIG. 6 shows a method for driving the backlight module according to an embodiment of the present disclosure, and the method may be applied to the above driving device, and the method includes the following steps 601 and 602.

At step 601, a time series of voltage signal is output to a controller by a driving component.

At step 602, a plurality of lines of point sources in respective light-emitting areas are driven by the controller to be turned on respectively at different periods based on the time series of voltage signal such that the lines of point sources in the light-emitting areas emit light at the different periods.

Optically, the time series of voltage signal is a timing voltage signal which is step-shaped and has a plurality of steps whose voltage values are progressively increased at different periods in one cycle.

Optically, in a case where the controller includes a plurality of overvoltage protection circuits corresponding to respective light-emitting areas one by one, the ranges of preset voltage values of the overvoltage protection circuits corresponding to different light-emitting areas do not overlap with each other.

The step 602 includes: when a voltage signal output from the driving component falls within a range of preset voltage values of an overvoltage protection circuit corresponding to a light-emitting area, supplying, by the controller, a driving voltage signal to the light-emitting area and driving the lines of point sources in the light-emitting area to emit light.

Optically, the lines of point sources correspond to a plurality of lines of pixel units in a display panel line by line.

In an embodiment, the step 602 includes: driving, by the controller, the lines of point sources in a light-emitting area to emit light after a first time delay elapses from a time instant that a line scan of the respective lines of pixel units corresponding to the lines of point sources is completed.

In an embodiment, the first time delay is a time required by the respective lines of pixel units to complete deflection of liquid crystal molecules.

In the embodiment, the line scan of a line of pixel units and the deflection of the liquid crystal molecules corresponding to the line of pixel units have been completed before a corresponding line of point sources is driven to be turned on by the controller.

For example, the first light-emitting area includes the first through fourth lines of point sources. After the line scan of the first through fourth lines of pixel units and the deflection of the liquid crystal molecules corresponding to the lines of pixel units have been completed, the overvoltage protection circuit then simultaneously turns on the first through fourth lines of point sources.

With the overvoltage protection circuit of the present embodiment, the controller may drive the lines of point sources of each light-emitting area to be turned on with a time delay. For example, after a first time delay elapses from the point sources in the first light-emitting area being turned on, the second light-emitting area is turned on, and so on, thereby turning on the lines of point sources of each light-emitting area with a time delay.

In the present embodiment, the backlight module is divided into a plurality of light-emitting areas, each of the light-emitting areas including a plurality of lines of point sources, and the driving device includes a controller and a driving component, the driving component is connected to the controller and is configured to output a time series of voltage signal to the controller, and the controller is connected to the plurality of lines of point sources in the light-emitting areas and is configured to drive the lines of point sources in the light-emitting area to emit light respectively at different periods based on the time series of voltage signal. Therefore, the driving IC can be reused, the number of the driving ICs can be reduced, and the area of the PCB can be reduced.

It should be noted that, for the foregoing method embodiment, for the sake of simple description, they are all expressed as a series of actions, but those skilled in the art should understand that the present disclosure is not limited by the described action sequence, since in accordance with the present disclosure, certain steps may be performed in other sequences or concurrently. In addition, those skilled in the art should also understand that the embodiments described in the description are all embodiments, and the actions involved are not necessarily required by the present disclosure.

For the above-mentioned method embodiments, the description is relatively simple because they are basically similar to the product embodiments, and the relevant points can be referred to the product embodiments.

Each of the embodiments in this description is described in a progressive manner. Each of the embodiments highlights the difference from other embodiments. The same and similar parts of the respective embodiments can be learned from each other.

It is easily conceived by those skilled in the art to imagine that any combination of the above-mentioned embodiments is feasible, so any combination of the above-mentioned embodiments is an implementation of the present disclosure, which will not be described in detail here due to limit space.

It should be noted that, in this description, relational terms such as first and second are used only to distinguish one entity or operation from another entity or operation, without requiring or implying any such actual relationship or order between these entities or operations. Moreover, the terms "include" and "comprise" include not only those elements, but also other elements that are not explicitly listed, or elements inherent to such processes, methods, articles or equipment. Without any explicitly contrary statement, the phrase "including . . . " does not exclude other element in the process, method, article or equipment.

Moreover, the term "and/or" indicates including both the "and" and the "or" relationships. That is, if the relationship between solution A and solution B is "and", it means that both solution A and solution B may be included in an embodiment; and if the relationship between solution A and solution B is "or", it represents an embodiment in which the solution may be included separately, or the solution B may be included separately.

Although certain embodiments of the present disclosure have been described, additional variants and modifications to these embodiments may be made once the basic creative concepts are known to those skilled in the art.

A method for driving a backlight module, a driving device, a backlight module and a display apparatus provided by the present disclosure are described in detail above.

Specific examples are used to illustrate the principles and embodiments of the disclosure. The above description of the embodiments is only intended to help understand the methods and core ideas of the disclosure. It should be understood that, the above embodiments are only exemplary embodiments for the purpose of explaining the principle of the present disclosure, and the present disclosure is not limited thereto. For one of ordinary skill in the art various variants and modifications may be made without departing from the spirit and essence of the present disclosure. These variants and modifications also fall within the protection scope of the present disclosure.

What is claimed is:

1. A driving device for driving a backlight module which is divided into a plurality of light-emitting areas which are connected in parallel with each other, each of the light-emitting areas comprising a plurality of lines of point sources, wherein the driving device comprises a controller and a driving component, the driving component is connected to the controller and is configured to output time series of voltage signal to the controller, and the controller comprises fifty channels, is connected between the plurality of lines of point sources in each of the plurality of light-emitting areas and the driving component, and is configured to drive the lines of point sources in the respective light-emitting areas to emit light respectively at different periods based on the time series of voltage signal, wherein the controller comprises a plurality of overvoltage protection circuits corresponding to the plurality of light-emitting areas one by one;

ranges of preset voltage values of the plurality of overvoltage protection circuits do not overlap with each other, and each of the plurality of overvoltage protection circuits having one terminal connected to the driving component and another terminal connected to the plurality of lines of point sources in a corresponding light-emitting area, is configured to supply a driving voltage signal to one light-emitting area and drive the lines of point sources in the one light-emitting area to emit light when a voltage signal output from the driving component falls within a range of preset voltage values of one of the plurality of overvoltage protection circuits corresponding to the one light-emitting area, wherein respective lines in a light emitting area are provided with a same number of point sources; the number of point sources in a light-emitting area increases as a sequence number of the line in which the light-emitting area is located increases; and the clamp voltage of the Zener diode of the overvoltage protection circuit corresponding to the light-emitting area increases as the sequence number of the line in which the light-emitting area is located increases;

the backlight module comprises a thousand backlight partitions arranged as 20 lines*50 columns, which are divided into five light-emitting areas, each of the light-emitting areas comprises four lines of point sources, the number of point light sources in the light-emitting areas is arranged in arithmetic sequence, and the 50 columns of backlight partitions are respectively connected with the 50 channels of the controller.

2. The driving device of claim 1, wherein a lower limit of the range of the preset voltage values of the overvoltage protection circuit is associated with a turn-on voltage for the plurality of point sources in the light-emitting area corresponding to the overvoltage protection circuit, the turn-on voltages for the plurality of point sources in respective the light-emitting areas are different from each other, and an upper limit of the range of the preset voltage values of the overvoltage protection circuit is associated with a clamp voltage of the Zener diode of the overvoltage protection circuit.

3. The driving device of claim 2, wherein the turn voltage of the point sources in each of the light-emitting areas is determined by changing the number of point sources in the light-emitting area.

4. The driving device of claim 1, wherein each line in a same light-emitting area is provided with a same number of point sources, and the arithmetic sequence has an arithmetic progression having a tolerance of 4.

5. The driving device of claim 1, wherein the time series of voltage signal output from the driving component is a timing voltage signal which is step-shaped and has different steps at different periods in one cycle, and voltage values at the different steps are progressively increased with time.

6. A display apparatus comprising a driving device, wherein the driving device is the driving device of claim 1.

7. The driving device of claim 1, wherein the overvoltage protection circuit comprises only one Zener diode, only one transistor and one resistor;
one end of the Zener diode is connected to both one end of the resistor and a gate electrode of the transistor, and the other end of the Zener diode is connected to ground;
the other end of the resistor is connected to both a drain electrode of the transistor and the driving component, and a source electrode of the transistor is connected to the plurality of lines of point sources in the light-emitting area corresponding to the overvoltage protection circuit, and
clamp voltages of the Zener diodes of the overvoltage protection circuits corresponding to the respective light-emitting areas are different from each other, and the number of point sources in one of the light-emitting areas is different from the number of point sources in another light-emitting area of the light-emitting areas.

8. A method for driving a backlight module by a driving device, wherein
the backlight module is divided into a plurality of light-emitting areas which are connected in parallel with each other, each of the light-emitting areas comprising a plurality of lines of point sources,
the driving device comprises a controller and a driving component,
the driving component is connected to the controller, and the controller is connected between the plurality of lines of point sources in each of the plurality of light-emitting areas and the driving component,
wherein the controller comprises a plurality of overvoltage protection circuits corresponding to the plurality of light-emitting areas one by one;
ranges of preset voltage values of the plurality of overvoltage protection circuits do not overlap with each other, and
each of the plurality of overvoltage protection circuits having one terminal connected to the driving component and another terminal connected to the plurality of lines of point sources in a corresponding light-emitting area, is configured to supply a driving voltage signal to one light-emitting area and drive the lines of point sources in the one light-emitting area to emit light when a voltage signal output from the driving component falls within a range of preset voltage values of one of the plurality of overvoltage protection circuits corresponding to the one light-emitting area,
wherein respective lines in a light emitting area are provided with a same number of point sources; the number of point sources in a light-emitting area increases as a sequence number of the line in which the light-emitting area is located increases; and the clamp voltage of the Zener diode of the overvoltage protection circuit corresponding to the light-emitting area increases as the sequence number of the line in which the light-emitting area is located increases;
the backlight module comprises a thousand backlight partitions arranged as 20 lines*50 columns, which are divided into five light-emitting areas, each of the light-emitting areas comprises four lines of point sources, the number of point light sources in the light-emitting areas is arranged in arithmetic sequence, and the 50 columns of backlight partitions are respectively connected with the 50 channels of the controller, and
the method comprises:
outputting, by the driving component, a time series of voltage signal to the controller; and
driving, by the controller, the lines of point sources in respective light-emitting areas respectively at different periods based on the time series of voltage signal such that the lines of point sources in respective light-emitting areas emit light at different periods.

9. The method of claim 8, wherein the time series of voltage signal output from the driving component is a timing voltage signal which is step-shaped and has different steps at different periods in one cycle, and voltage values at the different steps are progressively increased with time.

10. The method of claim 8, wherein the step of driving, by the controller, the lines of point sources in respective light-emitting areas respectively at different periods based on the time series of voltage signal, such that the lines of point sources in respective light-emitting areas emit light at different periods comprises:
outputting, by the controller, a driving voltage signal to one light-emitting area and drive the lines of point sources in the one light-emitting area to emit light when a voltage signal output from the driving component falls within a range of preset voltage values of one of the plurality of overvoltage protection circuits corresponding to the one light-emitting area.

11. The method of claim 8, wherein
the lines of point sources in the backlight module correspond to a plurality of lines of pixel units in a display panel line by line, and
the step of driving, by the controller, the lines of point sources in respective light-emitting areas respectively at different periods based on the time series of voltage signal, such that the lines of point sources in respective light-emitting areas emit light at different periods comprises:
driving, by the controller, the lines of point sources in a light-emitting area to emit light after a first time delay elapses from a time instant that a line scan of respective lines of pixel units corresponding to the lines of point sources is completed.

12. The method of claim 11, wherein the first time delay is a time required by the respective lines of pixel units to complete deflection of liquid crystal molecules.

* * * * *